US008185712B2

(12) United States Patent
Sarkar et al.

(10) Patent No.: US 8,185,712 B2
(45) Date of Patent: May 22, 2012

(54) SYSTEM AND METHOD FOR INTELLIGENT STORAGE MIGRATION

(75) Inventors: Prasenjit Sarkar, San Jose, CA (US); Omer A. Zaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/835,570

(22) Filed: Aug. 8, 2007

(65) Prior Publication Data

US 2009/0043822 A1    Feb. 12, 2009

(51) Int. Cl.
*G06F 12/00* (2006.01)

(52) U.S. Cl. .................. 711/167; 711/E12.098

(58) Field of Classification Search .......... 711/162, 711/170, 167; 714/5
See application file for complete search history.

(56) References Cited

U.S. PATENT DOCUMENTS

| | | |
|---|---|---|
| 2002/0161778 A1 | 10/2002 | Linstedt |
| 2004/0123180 A1* | 6/2004 | Soejima et al. .................. 714/5 |
| 2005/0071482 A1* | 3/2005 | Gopisetty et al. ............. 709/229 |
| 2005/0165817 A1 | 7/2005 | O'Conor |
| 2005/0246386 A1 | 11/2005 | Sullivan et al. |
| 2006/0026012 A1 | 2/2006 | Campbell |
| 2006/0053251 A1 | 3/2006 | Nicholson et al. |
| 2006/0149748 A1 | 7/2006 | Yamakawa et al. |
| 2006/0235899 A1 | 10/2006 | Tucker |

OTHER PUBLICATIONS

Analysis of Long Term File Reference Patterns for Application to File Migration Algorithms, Alan Jay Smith, IEEE Transactions on Software Engineering, vol. SE-7, No. 4, Jul. 1981, pp. 403-417.
Automatic Data Migration for Reducing Energy Consumption in Multi-Bank Memory Systems, Luz et al., DAC 2002, Jun. 10-14, 2002, New Orleans, Louisiana, USA, ACM 0-58113-461-4/02/0006, pp. 213-218.
Cimitile et al, 'Incremental Migration Strategies: Data Flow Analysis for Wrapping.'; In Proceedings of the Working Conference on Reverse Engineering (Wcre'98) (Oct. 12-14, 1998). WCRE. IEEE Computer Society, Washington, DC, 59.
Hohenstein, U., 'Supporting Data Migration Between Relational and Object-Oriented Databases Using a Federation Approach.'; In Proceedings of the 2000 international Symposium on Database Engineering & Applications (Sep. 18-20, 2000). IEEE Computer Society, Washington, DC, 371-379.

(Continued)

*Primary Examiner* — Reginald Bragdon
*Assistant Examiner* — Victor Wang
(74) *Attorney, Agent, or Firm* — Cantor Colburn LLP; Mohammed Kashef

(57) ABSTRACT

The present invention relates to a methodology and computer program product for data storage migration that comprises monitoring a plurality of entities that comprise a storage area network for a predetermined set of information gathering cycles, constructing a resource graph that is representative of the entities that are comprised within the storage area network, and analyzing the resource graph. Further comprised are the determining of a data storage source and a data storage target for the migration of data stored at the data storage source, determining a time period and an execution point for the migration of the stored data, determining a data migration schedule, migrating the stored data according to the determined data migration schedule, and monitoring the data migration operation until the completion of the data migration operation.

20 Claims, 2 Drawing Sheets

OTHER PUBLICATIONS

Lee et al., 'Enhancing Data Migration Performance via Parallel Data Compression'; 16th International Parallel and Distributed Processing Symposium (IPDPS 2002), Apr. 15-19, 2002, Fort Lauderdale, FL, USA.

Automated Storage Management with QoS Guarantees, [online]; [retrieved on Jan. 18, 2010]; retrieved from the Internet http://www.cs.ucsb.edu/~dsl/publications/2006/qiao_ICDE_2006.pdf.

Efficient Data Migration in Self-managing Storage Systems, [online]; [retrieved on Jan. 19, 2010]; retrieved from the Internet http://www.cs.umass.edu/~twood/pubs/shenoy-icac06.pdf.

Zhu et al., 'Supporting Load Balancing and Efficient Reorganization During System Scaling'; 19th International Parallel and Distributed Processing Symposium (IPDPS 2005), Proceedings, Apr. 4-8, 2005, Denver, CA, USA 2005.

* cited by examiner

SYSTEM AND METHOD FOR INTELLIGENT STORAGE MIGRATION

BACKGROUND OF THE INVENTION

1. Field of the Invention

This invention relates to the migration of storage data within storage area networks, and particularly to the automated planning and execution of a storage data operation within a storage area network.

2. Description of Background

Conventionally, storage area networks (SANs) are implemented to separate data storage from application servers, wherein storage serves as a first-class entity that provides services to applications. Currently, the organization of most SANs is accomplished using manual organizational means. Manually organized performance tasks are usually performed in ad-hoc manner, thus leading to the possibility of error-prone and time-consuming organizational decision making tasks. For example, in customer sites, migrating storage volumes from one storage controller to another storage controller can take months; with several missteps possibly occurring along the way. Unfortunately, within busy data centers, the on-demand organization of the storage area network is needed all the time.

SUMMARY OF THE INVENTION

The shortcomings of the prior art are overcome and additional advantages are provided through the provision of a method for data storage migration. The method comprises monitoring a plurality of entities that comprise a storage area network for a predetermined set of information gathering cycles, constructing a resource graph that is representative of the entities that are comprised within the storage area network, and analyzing the resource graph. The method further comprises determining a data storage source and a data storage target for the migration of data stored at the data storage source, determining a time period and an execution point for the migration of the stored data, determining a data migration schedule, migrating the stored data according to the determined data migration schedule, and monitoring the data migration operation until the completion of the data migration operation.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
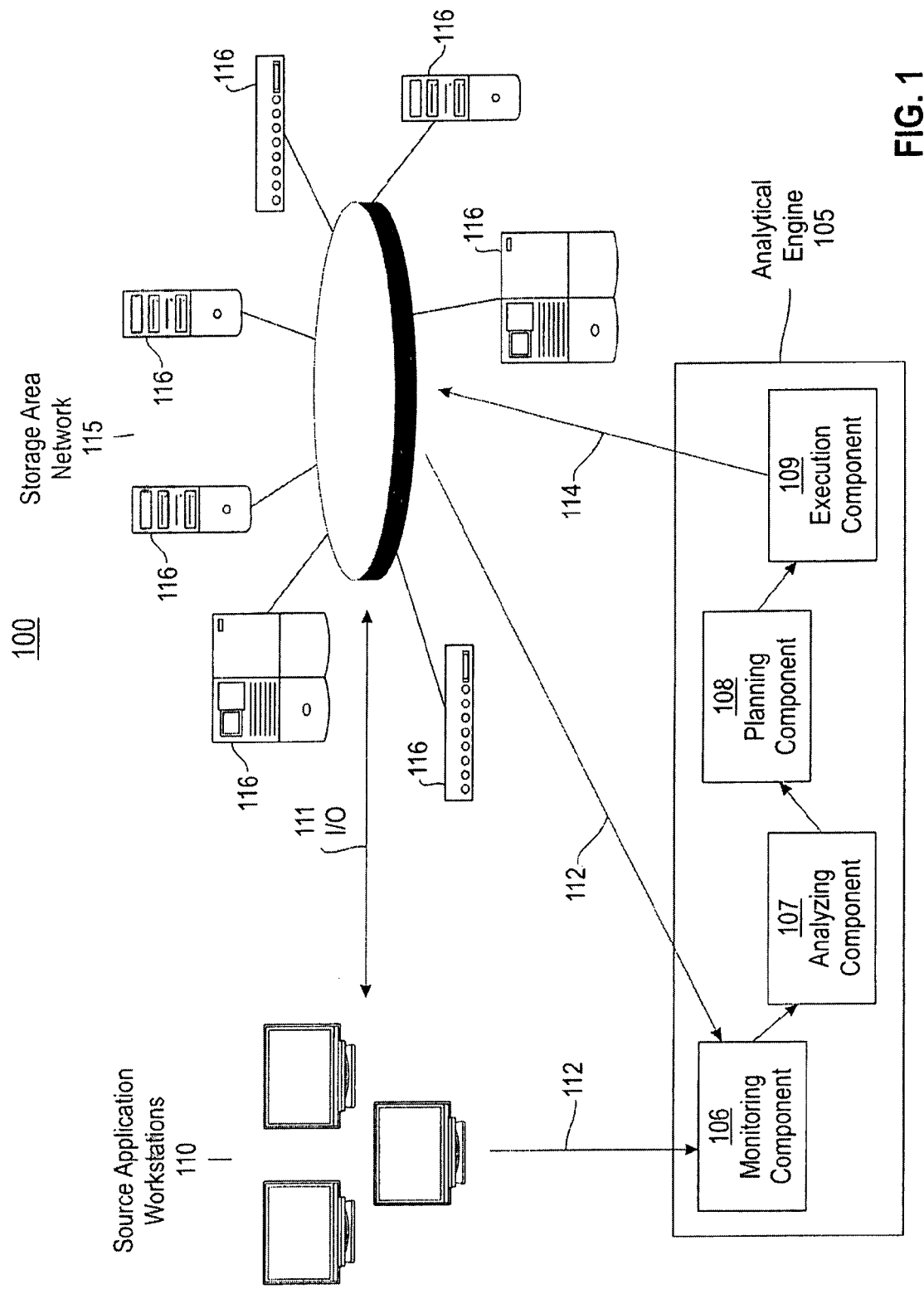
FIG. 1 illustrates one example of the architecture of a system in which an exemplary embodiment of the present invention can be implemented.

The detailed description explains the preferred embodiments of the invention, together with advantages and features by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Aspects of exemplary embodiments of the present invention can be implemented within a conventional computing system environment comprising hardware and software elements. Specifically, the methodologies of the present invention can be implemented to program a computer to accomplish the prescribed tasks of the present invention as described below.

Exemplary embodiments of the present invention relate to an intelligent storage migration architecture that provides an autonomic engine for the performance of a set of analyses on a storage infrastructure and as a result determines the movement of storage volumes that need to be migrated in the infrastructure to meet the needs of applications as well as storage infrastructure changes. In particular, the analysis identifies the set of volumes that may need to be migrated and identifies the target storage pool (in the same or a different subsystem) where the volumes should be migrated. The goal of the analysis is to perform a long-term decision making analysis—in other words, it is desired to take the minimum number of decisions in a specified future time period such that the storage infrastructure be load balanced with respect to several optional parameters (e.g., storage infrastructure performance, cost, power etc.). Further, the analysis identifies the best schedule for the migration based on application access patterns.

Data storage migration involves moving data units from a source location to a destination location, wherein the movement involves copying the contents of the data. Typically, storage migration can be categorized into two types of migration: transparent migration and disruptive migration. Within transparent migration, the ownership of the data is moved to a destination location. This type of migration involves the careful re-creation of all associations and replication relationships between the data volumes at the destination location. It is desirable that the performance of the move be non-disruptive in that the data unit is accessible while die migration is in progress.

Within disruptive migration, the use of copy services such as snapshot or mirroring is used to copy the contents of the data volumes from a source location to a destination location. However, in contrast to transparent migration, the ownership of the data volumes does not change. Therefore to make the migration effective, the application must be disrupted so that any implemented application starts accessing data from the target location instead of the source location. Data storage migration can further be categorized as internal and external, wherein internal migration entails relocating data within the storage controller. External migration involves relocating data from one storage controller to another. The exemplary embodiments of the present invention implement an analytical engine described below that is configured to monitor, schedule, and perform the differing types of migrations described above.

Turning now to the drawings in greater detail, it will be seen that in FIG. 1 there is a diagram detailing the architecture of an intelligent data storage migration system 100 wherein the analytical engine 105 is implemented. The I/O communication transactions 111 between applications residing at the workstations 110 and the SAN 115 are monitored (112) by the analytical engine 105. The SAN 115 comprises a plurality of conventional network entities 116 (e.g., host severs, switches, storage arrays, etc. . . . ). The analytical engine 105 further comprises a plurality of software components. The software components comprising a monitoring component 106, an analyzing component 107, a migration schedule planning component 108, and an execution component 109.

The monitoring component 106 of the analytical engine 105 is configured to gather information about the I/O activity in the storage area network 115 from the entities 116 that are present within the SAN 115. Within typical storage area networks the entities 116 can comprise hosts, switches and storage arrays—each of which may serve as a virtualization point within the SAN 115. On host entities 116, there may exist file systems, databases and other applications that are consumers of network storage. Upon the SAN 115 fabric, there may exist entities 116 such as switches and ports that provide data pathways between storage volumes and applications. Further, storage arrays can provide the storage volumes where data is stored for applications as well as storage pools from where die volumes are constructed. Additionally, each physical entity 116 in the SAN 115 has various sub-components (buses, switches) that need to be monitored.

The monitoring component 106 gathers information in regard to all of these entities 116 in the SAN 115 as well as their associations and attributes for a predetermined number of information gathering cycles. At the end of an information gathering cycle, it is possible to construct a graph G where the vertices V form the entities in a storage area network and the edges E form the I/O connectivity associations between the vertices V. The edges E have static attributes associated with them (such as capacity) as well dynamic attributes that have been associated with them (such as utilization in a certain information gathering cycle).

The analyzation component 107 analyzes the information gathered through numerous information-gathering cycles. The first step in the information gathering process is the performance of a time-series analysis of the utilization of each edge E in the graph G to identify any trends and seasonality in regard to the performance of the monitored entities 116. Once the trends and seasonality have been established with a high degree of confidence, a look-ahead prediction of the utilization of an edge in E with respect to the capacity is performed.

In particular, there are two special cases to be considered. In the case where a storage subsystem is to be retired, the utilization of each edge corresponding to an entity in the storage subsystem the utilization of each edge can be set to infinity, thus automatically triggering off an analysis of the SAN 115 for migration. In the case, where a new storage subsystem is to be introduced into the system, then the utilization of each edge is set to zero to allow for migration.

The inputs into the analytical system that will determine the result of the analysis: the weights attached to each of the objectives of the migration can include utilization, utilization in terms of cost, utilization in terms of floor space required for any network entities 116, and the utilization in terms of thermal output of any required network entities 116. Next, these objective weights are applied to each utilization edge in E to normalize the utilization and capacity with the final objective of migration.

After this, a network flow analysis is performed to find an augmenting path that will better the imbalance in the utilization of the SAN 115. The augmenting path indicates the configuration change that has to happen in terms of migration. The augmenting path is utilized to determine the source and target of the migration. Within further embodiments of the present invention it is possible to choose multiple non-overlapping augmenting paths in parallel to allow for multiple migrations to be performed.

Once the source and target of the migration have been determined, the time and the execution point of the migration are to be planned. This function being the responsibility of the planning component 108. In this case, we assume a series of virtualization points between the application or applications that access a storage volume and the volume itself. If no virtualization points are present, then a disruptive migration technique to perform the migration (such as a copy service). If there are virtualization points present, then we choose the virtualization point in the augmenting path that is closest to the source storage volume. The impetus behind this decision is to minimize the disruption in the storage area network in terms of utilization differential.

The next step in the planning is to determine the schedule of migration. It is necessary to determine the migration schedule based on the time series analysis of the utilization of the source and target storage volume as well as the time constraint imposed by the storage area network administrator. The typical policy would be to use the lowest average utilization time period in the source and target storage volumes within the time period specified by the administrator. Of course, if multiple migrations are scheduled in parallel, the impact on the utilization of each of them has to be identified by projecting the typical migration bandwidth.

Once the schedule of migration has been determined and the source and target of migration has been determined, the execution component 109 initiates the data migration and monitors the rate of data migration until the operation is complete.

Figure 2:
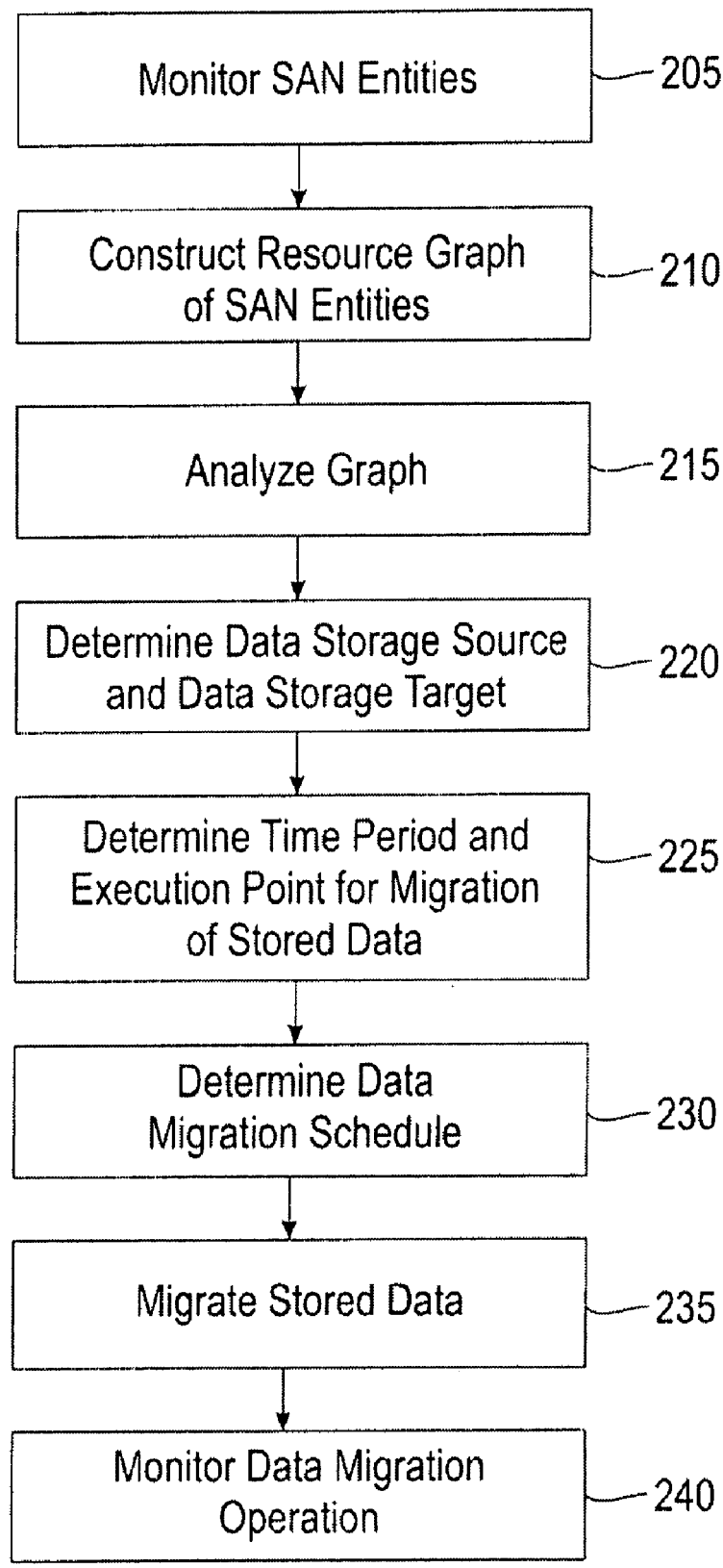
FIG. 2 illustrates one example of a flow diagram detailing aspects of a data storage migration methodology performed in accordance with exemplary embodiments of the present invention.

FIG. 2 shows a flow diagram detailing a method for data storage migration that can be performed in accordance with exemplary embodiments of the present invention. At step 205 a plurality of entities 116 that comprise a SAN 115 are monitored for a predetermined set of information gathering cycles. Information pertaining to the I/O activity of each respective entity 116 within the SAN 115, the connectivity association between the respective entities 116, and the attributes of each respective entity 116 are monitored and retrieved. At step 210 a resource graph is constructed, wherein the resource graph is representative of the entities 116 that are comprised within the SAN 115. Within the resource graph, the vertices of the resource graph represent the entities within the storage area network, and edges of the graph represent the I/O connectivity associations between the vertices.

At step 215 the resource graph the resource graph is analyzed, wherein the analysis of the entity 116 resource graph further comprises performing a time-series analysis of a utilization of each edge that is represented within the resource graph, the time-series analysis being performed in order to identify entity utilization trends within the SAN 115 and the seasonal utilizations of the entities within the SAN 115. Further, a predictive projection of the analyzed utilization of each edge within the resource graph for a predetermined time period is performed. The edges of the resource graph are further analyzed to determine the utilization of each edge in relation to the cost, the physical space requirements, and the thermal output for each edge represented within the resource graph.

The determined utilizations for each edge are normalized in order to produce a normalized utilization analysis for each edge represented within the resource graph. Next a network flow analysis is performed in order to identify an augmenting path, the augmenting path indicating the configuration changes that will result in the storage area network as a result of a data storage migration operation. The augmented data path is utilized to determine a data storage source and data storage target for a data storage migration operation (step 220). At step 225 a time period and an execution point for the migration of the stored data are determined in addition to a data migration schedule at step 230. Next, at step 235, the stored data is migrated according to the determined data migration schedule, wherein the data migration operation is monitored until the completion of the data migration operation (step 240).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for data storage migration, the method comprising:
    monitoring a plurality of entities that comprise a storage area network for a predetermined set of information gathering cycles;
    constructing a resource graph that is representative of the entities that are comprised within the storage area network, the resource graph including utilization edges;
    analyzing the resource graph;
    determining objectives of the data storage migration including a movement of storage volumes to be migrated, a data storage source and a data storage target for the migration of data stored at the data storage source, which determine utilization of the data storage source and the data storage target;
    attaching utilization in terms of cost, utilization in terms of floor space required for any network entities, and the utilization in terms of thermal output of the plurality of entities to the objectives of the migration of the data;
    applying the utilization in terms of cost, utilization in terms of floor space required for any network entities, and the utilization in terms of thermal output of the plurality of entities to the utilization edges of the resource graph to determine changes to the storage area network as a result of the data migration;
    determining a time period and an execution point for the migration of the stored data;
    determining a data migration schedule;
    migrating the stored data according to the determined data migration schedule; and
    monitoring the data migration operation until the completion of the data migration operation.

2. The method of claim 1, wherein information pertaining to the I/O activity of each respective entity, the connectivity association between the respective entities, and the attributes of each respective entity is monitored and retrieved.

3. The method of claim 2, wherein vertices of the resource graph represent the entities within the storage area network, and edges of the graph represent the I/O connectivity associations between the vertices.

4. The method of claim 3, wherein analyzing the entity resource graph further comprises performing a time-series analysis of a utilization of each edge that is represented within the resource graph, the time-series analysis being performed in order to identify entity utilization trends within a storage area network and the seasonal utilizations of the entities within the storage area network.

5. The method of claim 4, further comprising performing a predictive projection of the analyzed utilization of each edge within the resource graph for a predetermined time period.

6. The method of claim 5, wherein the edges of the resource graph are further analyzed to determine the utilization of each edge in relation to the objectives of the migration of the data, the utilization including the cost, the physical space requirements, and the thermal output for each edge represented within the resource graph.

7. The method of claim 6, further comprising normalizing the determined utilizations for each edge to produce a normalized utilization analysis for each edge represented within the resource graph.

8. The method of claim 7, further comprising performing a network flow analysis in order to identify an augmenting path, the augmenting path indicating the configuration changes that will result in the storage area network as a result of a data storage migration operation, wherein multiple augmenting paths are selected for at least one additional data migration.

9. The method of claim 8, wherein the augmented data path is utilized to determine a data storage source and data storage target for a data storage migration operation.

10. The method of claim 1, wherein the utilization edges are set to infinity for a storage subsystem that is being retired, thereby triggering an analysis for migration, and wherein the utilization edges are set to zero for a new storage subsystem being introduced to enable migration of the new storage subsystem.

11. A computer program product that includes a non-transitory computer readable medium useable by a processor, the medium having stored thereon computer readable program code for providing and facilitating a data storage migration operation by:
    monitoring a plurality of entities that comprise a storage area network for a predetermined set of information gathering cycles;
    constructing a resource graph that is representative of the entities that are comprised within the storage area network, the resource graph including utilization edges;
    analyzing the resource graph;
    determining objectives of the data storage migration including a movement of storage volumes to be migrated, a data storage source and a data storage target for the migration of data stored at the data storage source, which determine utilization of the data storage source and the data storage target;

attaching utilization in terms of cost, utilization in terms of floor space required for any network entities, and the utilization in terms of thermal output of the plurality of entities to the objectives of the migration of the data;

applying the utilization in terms of cost, utilization in terms of floor space required for any network entities, and the utilization in terms of thermal output of the plurality of entities to the utilization edges of the resource graph to determine changes to the storage area network as a result of the data migration;

determining a time period and an execution point for the migration of the stored data;

determining a data migration schedule;

migrating the stored data according to the determined data migration schedule; and monitoring the data migration operation until the completion of the data migration operation.

12. The computer program product of claim 11, wherein information pertaining to the I/O activity of each respective entity, the connectivity association between the respective entities, and the attributes of each respective entity is monitored and retrieved.

13. The computer program product of claim 12, wherein vertices of the resource graph represent the entities within the storage area network, and edges of the graph represent the I/O connectivity associations between the vertices.

14. The computer program product of claim 13, wherein analyzing the entity resource graph further comprises performing a time-series analysis of a utilization of each edge that is represented within the resource graph, the time-series analysis being performed in order to identify entity utilization trends within a storage area network and the seasonal utilizations of the entities within the storage area network.

15. The computer program product of claim 14, further comprising performing a predictive projection of the analyzed utilization of each edge within the resource graph for a predetermined time period.

16. The computer program product of claim 15, wherein the edges of the resource graph are further analyzed to determine the utilization of each edge in relation to the objectives of the migration of the data, the utilization including the cost, the physical space requirements, and the thermal output for each edge represented within the resource graph.

17. The computer program product of claim 16, further comprising normalizing the determined utilizations for each edge to produce a normalized utilization analysis for each edge represented within the resource graph.

18. The computer program product of claim 17, further comprising performing a network flow analysis in order to identify an augmenting path, the augmenting path indicating the configuration changes that will result in the storage area network as a result of a data storage migration operation, wherein multiple augmenting paths are selected for at least one additional data migration.

19. The computer program product of claim 18, wherein the augmented data path is utilized to determine a data storage source and data storage target for a data storage migration operation.

20. The computer program product of claim 11, wherein the utilization edges are set to infinity for a storage subsystem that is being retired, thereby triggering an analysis for migration, and wherein the utilization edges are set to zero for a new storage subsystem being introduced to enable migration of the new storage subsystem.

* * * * *